United States Patent
Stadler et al.

(10) Patent No.: US 9,836,288 B2
(45) Date of Patent: Dec. 5, 2017

(54) EAGER AND OPTIMISTIC EVALUATION OF PROMISES

(71) Applicant: Oracle International Corporation, Redwood Shores, CA (US)

(72) Inventors: Lukas Stadler, Oberkappel (AT); Thomas Wuerthinger, Utzenaich (AT); Gero Leinemann, Braunschweig (DE); Michael Haupt, Potsdam (DE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/690,592

(22) Filed: Apr. 20, 2015

(65) Prior Publication Data

US 2016/0117157 A1    Apr. 28, 2016

Related U.S. Application Data

(60) Provisional application No. 62/069,769, filed on Oct. 28, 2014.

(51) Int. Cl.
G06F 9/45 (2006.01)

(52) U.S. Cl.
CPC ........... G06F 8/443 (2013.01); G06F 8/41 (2013.01); G06F 8/4441 (2013.01); G06F 8/53 (2013.01)

(58) Field of Classification Search
CPC .... G06F 8/53; G06F 8/41; G06F 8/43–8/437; G06F 8/44; G06F 8/4435; G06F 8/4436; G06F 8/4441
See application file for complete search history.

(56) References Cited

U.S. PATENT DOCUMENTS

| | | | |
|---|---|---|---|
| 8,930,920 B2 * | 1/2015 | Wuerthinger | G06F 8/443 717/139 |
| 9,195,486 B2 * | 11/2015 | Porras | G06F 9/45525 |
| 2012/0030661 A1 * | 2/2012 | Porras | G06F 9/45525 717/153 |
| 2014/0189661 A1 * | 7/2014 | Wuerthinger | G06F 8/443 717/139 |

OTHER PUBLICATIONS

Kotzmann, T. and H. Mössenböck. "Escape Analysis in the Context of Dynamic Compilation and Deoptimization." Jun. 2005, ACM, VEE'05. pp. 111-120.*

(Continued)

*Primary Examiner* — Emerson Puente
*Assistant Examiner* — Erika Kretzmer
(74) *Attorney, Agent, or Firm* — Osha Liang LLP

(57) ABSTRACT

The invention relates to a method for generating executable code from application source code. The method steps include determining a programmatic expression using the application source code and determining a first value for the programmatic expression. The method steps further include compiling the programmatic expression into a first optimized code portion using the first value, an assumption, and an expression scope. The method steps further include executing the application source code. The method steps further include determining that the programmatic expression is modified outside of the expression scope, invalidating the assumption, and de-optimizing the first optimized code portion.

17 Claims, 5 Drawing Sheets

(56) References Cited

OTHER PUBLICATIONS

Schneider F., V. Menon, and T. Shpeisman. "Dynamic Optimization for Efficient Strong Atomicity". Oct. 2008. ACM OOPSLA'08. pp. 181-193.*
Faxen, K., "Cheap Eagerness: Speculative Evaluation in a Lazy Functional Language", ICFP'00, Montreal, Canada. 2000 (12 pages).
Maessen, J., "Eager Haskell, Resource-bounded execution yields efficient iteration", Haskell'02, Oct. 3, 2002, Pittsburg, Pennsylvania. (13 pages).
Ennals, R. et al., "Optimistic Evaluation: An Adaptive Evaluation Strategy for Non-Strict Programs", ICFP'03, Aug. 25-29, 2003, Uppsala, Sweden. (12 pages).

* cited by examiner

EAGER AND OPTIMISTIC EVALUATION OF PROMISES

CROSS-REFERENCE TO RELATED APPLICATION

This non-provisional utility patent application claims benefit of priority under 35 U.S.C. §119(e) from an earlier-filed U.S. provisional patent application, U.S. Application Ser. No. 62/069,769 entitled "Eager and Optimistic Evaluation of Promises," filed on behalf of Lukas Stadler, Thomas Wuerthinger, and Gero Leinemann on Oct. 28, 2014, the subject matter of which is hereby incorporated in its entirety by reference herein.

BACKGROUND

Functional programming languages and some programming languages with functional components provide a lazy evaluation scheme for argument passing in which the value of the expression used as an argument is evaluated only if it is actually needed within the called function. Efficient implementation of this lazy evaluation scheme may increase the speed with which some code written in such programming languages executes. Utilization of an eager and optimistic implementation which may be rolled back in the event the implementation is too optimistic may increase the reliability of such an implementation scheme.

SUMMARY

In general, in one aspect, the invention relates to a method for generating executable code from application source code. The method steps include determining a programmatic expression using the application source code and determining a first value for the programmatic expression. The method steps further include compiling the programmatic expression into a first optimized code portion using the first value, an assumption, and an expression scope. The method steps further include executing the application source code. The method steps further include determining that the programmatic expression is modified outside of the expression scope, invalidating the assumption, and de-optimizing the first optimized code portion.

In general, in one aspect, the invention relates to a system for generating executable code from application source code. The system includes a computer processor and a memory. The system also includes an optimization engine stored in the memory and executing on the computer processor, configured to determine a programmatic expression using the application source code and determine a first value for the programmatic expression. The optimization engine is further configured to compile the programmatic expression into a first optimized code portion using the first value, an assumption, and an expression scope, and de-optimize the first optimized code portion. The system also includes an execution engine stored in the memory and executing on the computer processor, configured to execute the application source code, determine that the programmatic expression is modified outside of the expression scope, and invalidate the assumption.

In general, in one aspect, the invention relates to a non-transitory computer readable medium for generating executable code from application source code including instructions that, when executed by a processor, perform a method. The method steps include determining a programmatic expression using the application source code and determining a first value for the programmatic expression. The method steps further include compiling the programmatic expression into a first optimized code portion using the first value, an assumption, and an expression scope. The method steps further include executing the application source code. The method steps further include determining that the programmatic expression is modified outside of the expression scope, invalidating the assumption, and de-optimizing the first optimized code portion.

Other aspects of the invention will be apparent from the following description and the appended claims.

DETAILED DESCRIPTION

Figure 1:
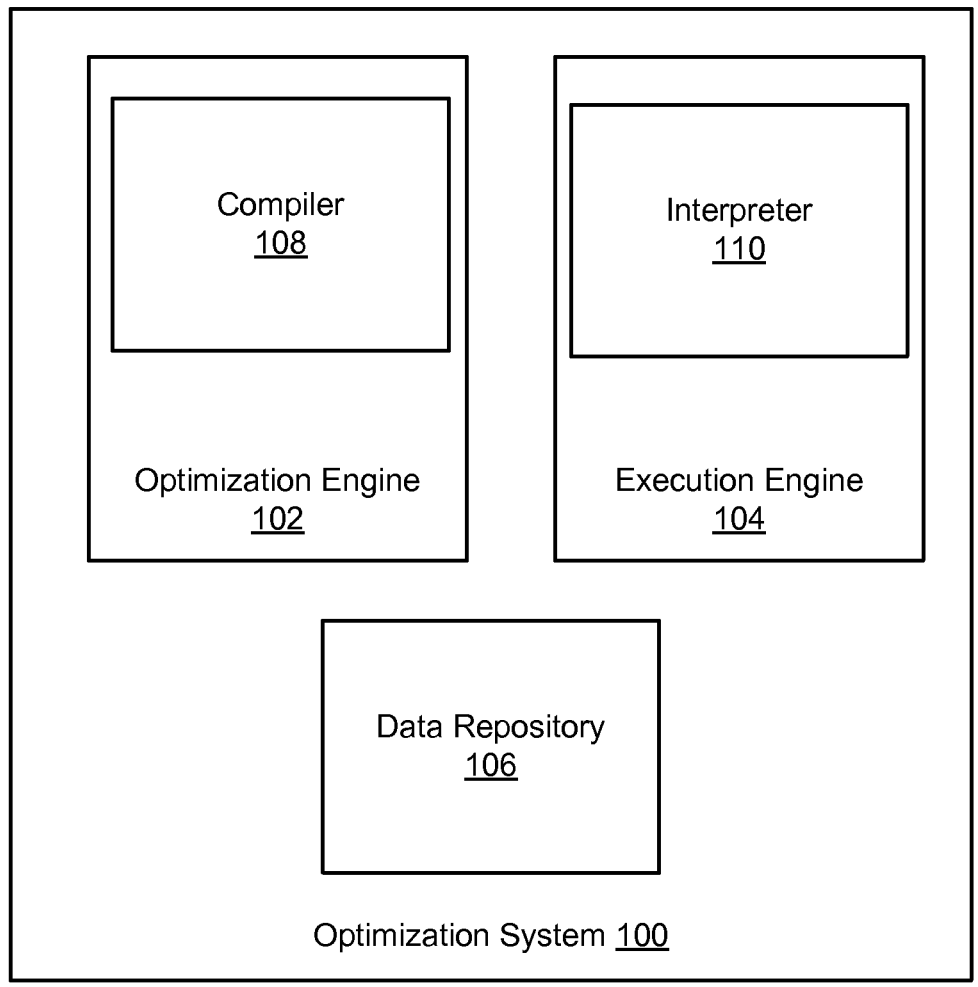
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 shows an optimization system (100) in accordance with one or more embodiments of the invention. In one or more embodiments, optimization system (100) includes an optimization engine (102), an execution engine (104), and a data repository (106). In one or more embodiments, optimization engine (102) includes a compiler (108). In one or more embodiments, execution engine (104) includes an interpreter (110). Each component is described in more detail below.

Figure 4:
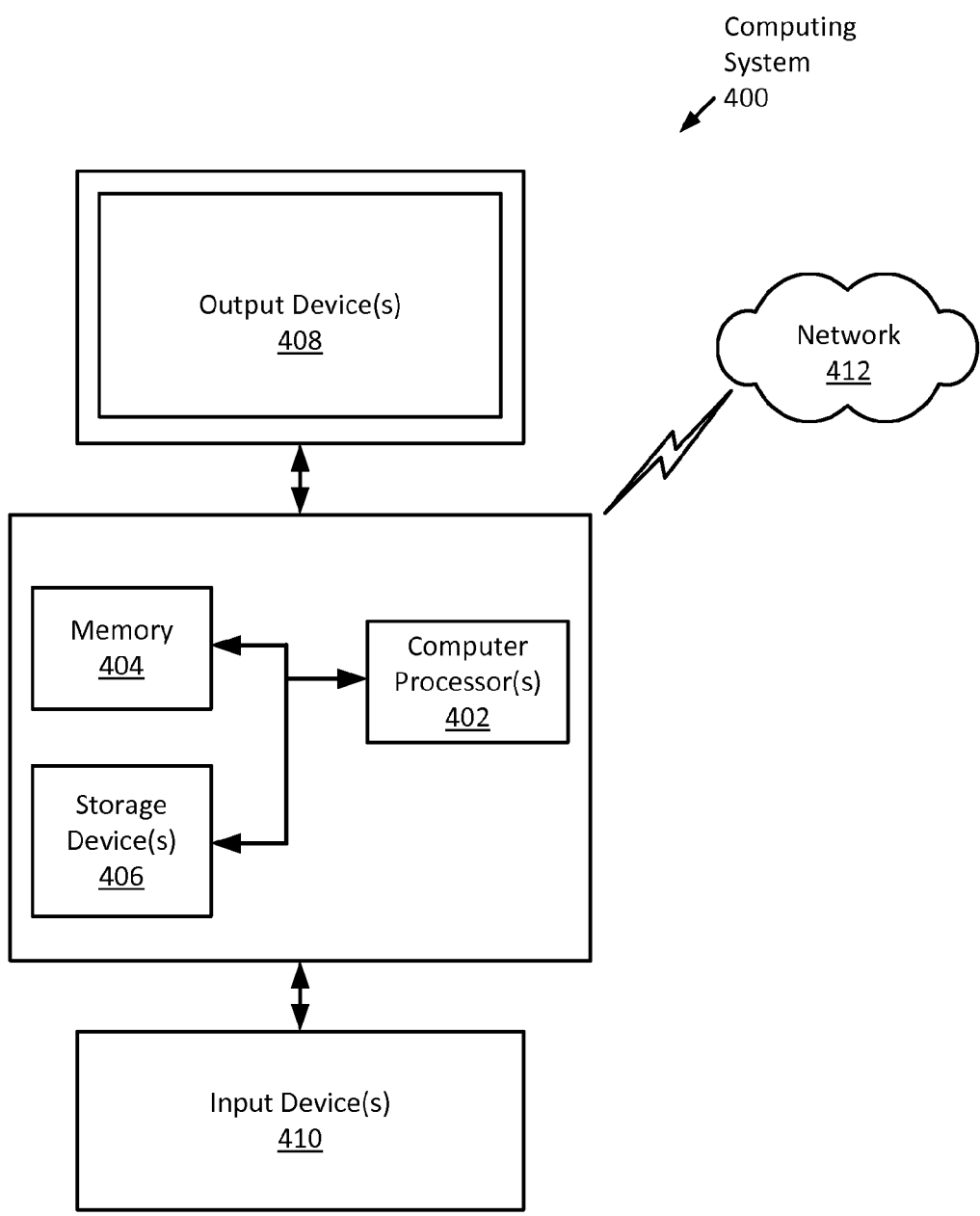
FIG. 4 shows a computing system in accordance with one or more embodiments of the invention.

The optimization system (100) may be any device with a processor and memory (e.g., the computer system shown and described in relation to FIG. 4) including, but not limited to: a desktop computer, a laptop computer, a tablet, a smartphone, a feature phone, a server, a blade, a handheld gaming device, smart computing glasses, and/or any other suitable device. Further, the optimization engine may include multiple different hardware units and/or devices.

The multiple hardware units and/or devices may or may not be of the same type or located at the same physical site.

In one or more embodiments, the components of the optimization system (100) (e.g., optimization engine (102), execution engine (104), and data repository (106)) are implemented on the same device or computer. In one or more alternative embodiments, one or more components of the optimization system (100) (e.g., optimization engine (102), execution engine (104), and/or data repository (106)) are implemented on separate devices or computers and operatively connected (e.g., by a local area network or a wide area network). The optimization system (100) may take the form of a specialized computer system of the type found and described in relation to FIG. 4, with output devices to show the optimized code, input devices to receive the application source code, and computer processor(s) that help with the optimization of the code by executing the optimization engine (102) and the execution engine (104). More detail for how the optimization is performed may be found below in connection with FIG. 2.

In one or more embodiments of the invention, optimization engine (102) operating on an optimization system (100) is a process or a group of processes that optimizes software code by, for example, optimistically optimizing promises so that they cause no overhead in the common case, along with a fallback mechanism for efficient and correct execution of the uncommon case.

Functional programming languages (e.g., Haskell, etc.) and some programming languages with functional components (e.g., R) provide a lazy evaluation scheme (i.e., "call-by-need") for argument passing in which the value of the expression used as an argument is evaluated only if it is actually needed within the called function. In one or more embodiments, a "promise" is the data passed into each function when that function is called. For example, a promise may be a variable (e.g., "value"), a trivial, well-known function applied to a variable (e.g., "len(value)"), an arbitrary piece of code (e.g., "value←value+1"), or a promise that is called recursively and passed from a first function into a second function, then from a second function into a third function. A promise may include one or more call-by-need arguments, in addition to any overhead data necessary to evaluate the arguments.

In one or more embodiments of the invention, an optimization engine (102) operating on an optimization system (100) provides a generic solution to the problem of determining whether eager evaluation of promises is possible or correct by applying optimistic assumptions and deoptimization. The optimization engine (102) operating on an optimization system (100) may also provide a fallback mechanism that allows efficient implementation of lazy evaluation even for the generic case by providing hints to inlining.

In one example, the handling of promises by an optimization engine (102) operating on an optimization system (100) functions in high-performance implementation of functional languages or languages with functional components. In another example, the handling of promises by an optimization engine (102) operating on an optimization system (100) functions in any implementation of a programming language which provides lazy evaluation. In another example, the handling of promises by an optimization engine (102) operating on an optimization system (100) may be generalized to the handling of closures in addition to promises, which are available in most modern programming languages.

In one or more embodiments, the optimization engine (102) includes a compiler (108). In one or more embodiments, a compiler (108) is a process or a collection of processes configured to generate compiled, executable code from one or more selections of application source code. A compiler may be configured to compile only a subset or portion of application source code, such that during execution of the application source code, portions of the application source code that are compiled are directly executed whereas portions of the application source code that are not compiled are interpreted by an interpreter (e.g., interpreter (110)). In one or more embodiments, the compiler (108) is configured to store and retrieve data from the data repository (106).

In one or more embodiments, the execution engine (104) is a process or a collection of processes executing on the optimization system (100) and configured to execute application source code. In one or more embodiments, the execution engine (104) includes an interpreter (110), which is a process or collection of processes configured to interpret application source code at runtime. In one or more embodiments, the execution engine (104) is configured to execute application source code which includes one or more sections of compiled code and one or more sections of interpreted code. For example, one or more functions or lines within a function within application source code may be compiled, such that during runtime the compiled portion is executed directly while the remainder of the application source code that is not compiled is executed by use of the interpreter (110).

In one or more embodiments, the data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site. In one or more embodiments, the data repository (106) includes functionality to store and retrieve application source code, programmatic expressions, and/or optimized code portions, each of which is described further below. In one or more embodiments, the data repository (106) is configured to store and retrieve data for the various components of the optimization system (100) (e.g., optimization engine (102), execution engine (104), compiler (108), and interpreter (110)).

Figure 2A:
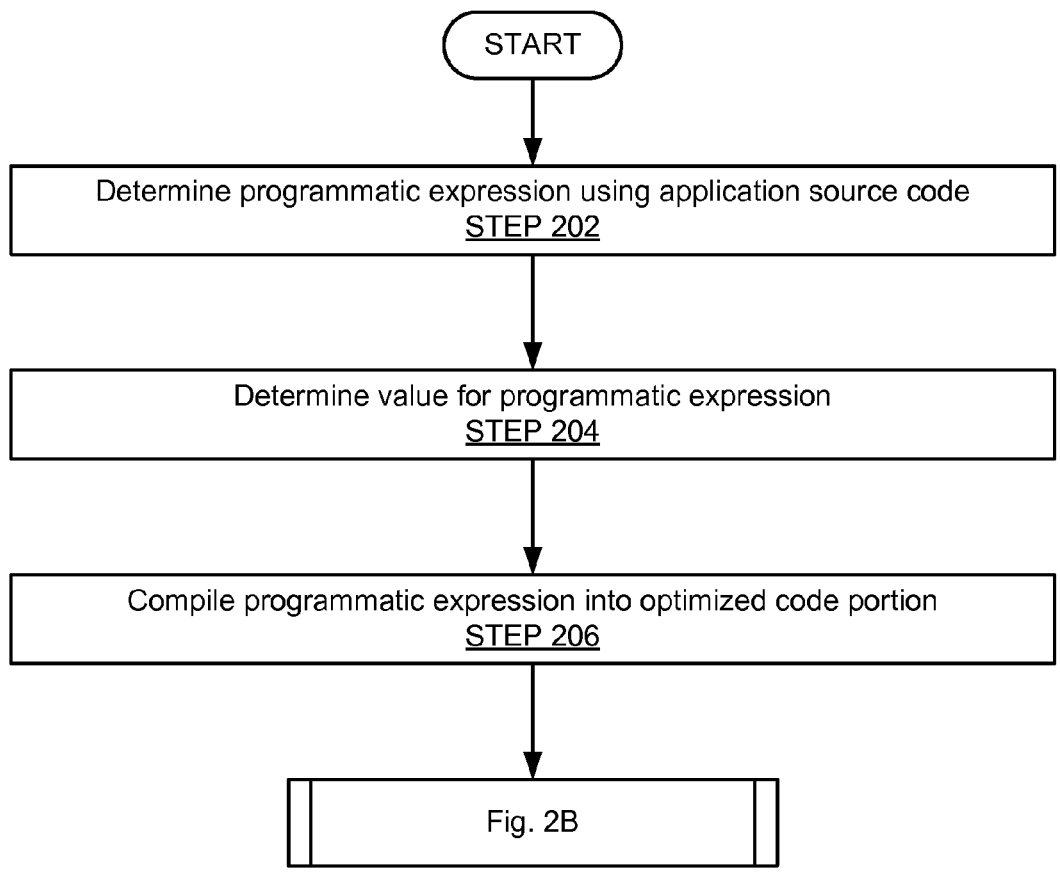
FIGS. 2A and 2B show flowcharts in accordance with one or more embodiments of the invention.

FIG. 2A shows a flowchart for generating executable code from application source code in one or more embodiments of the invention. As used below, a "caller" is a function which calls a "callee" function during its execution, and which may pass one or more arguments or parameters to the callee. In one or more embodiments, in STEP 202, a programmatic expression is determined using the application source code. In one or more embodiments, a programmatic expression is a subset of source code within the application source code that is passed into a callee function by a caller function and used by the callee function. For example, a programmatic expression may be a "promise" within the R programming language. In one or more embodiments, a programmatic expression may be a variable. For example, for the function "f1" that passes the variable "v1" into function "f2" as f1 calls f2 (i.e., within f1 a call to "f2(v1)"), the programmatic expression is determined to be "v1." In one or more embodiments, a programmatic expression may be a well-known, trivial, and side-effect free function as applied to a variable. For example, for the function "f3" that passes the length of the variable "v2" into function "f4" as f3 calls f4 (i.e., within f3 a call to "f4(len(v2))"), the programmatic expression is determined to be "len(v2)." In one or more embodiments, a programmatic expression may be a section of arbitrary or user-defined code. For example, for the function "f5" that passes the result of applying function "f6" to "v3" into function "f7" as f5 calls f7 (i.e., within f5 a call to "f7(f6(v3))"), the programmatic expression is determined to be "f6(v3)." In one or more embodiments, a programmatic expression may be a programmatic expression as received by a first function from a parent function and passed onto a second function. For example, for the function "f9" that receives programmatic expression "pe1" from function "f10" and then passes pe1 into function "f11" as parameter, the programmatic expression is determined to be pe1. In one or more embodiments, the programmatic expression is determined by the optimization engine.

In one or more embodiments, in STEP 204, a value is determined for the programmatic expression. In one or more embodiments, the value is determined by the optimization engine.

In one or more embodiments, determining a value for the programmatic expression includes determining a promise type for the programmatic expression. A promise type may be trivial, semi-trivial, or complex. In one or more embodiments, a trivial promise type is determined when the programmatic expression is a local variable passed as a parameter to a callee function. For example, for the function "f1" that passes the variable "v1" into function "f2" as f1 calls f2 (i.e., within f1 a call to "f2(v1)"), the programmatic expression of "v1" is determined to be trivial. In one or more embodiments, a semi-trivial promise type is determined when the programmatic expression is a well-known, trivial and side-effect free function evaluated on a local variable. For example, for the function "f3" that passes the length of the variable "v2" into function "f4" as f3 calls f4 (i.e., within f3 a call to "f4(len(v2))"), the programmatic expression of "len(v2)" is determined to be semi-trivial. Well-known, trivial, and side effect free functions are, for example, functions that pass all arguments by reference and lack any functionality for modifying variables outside of their scope. In one or more embodiments, a complex promise type is determined when the programmatic expression is a subset of arbitrary or user-defined code. For example, for the function "f5" that passes the result of applying function "f6" to "v3" into function "f7" as f5 calls f7 (i.e., within f5 a call to "f7(f6(v3))"), the programmatic expression of "f6(v3)" is determined to be complex.

In one or more embodiments, a promise type (e.g., trivial, semi-trivial, or complex) may further be classified as direct or indirect (e.g., direct trivial, indirect trivial, direct semi-trivial, etc.). In one or more embodiments, an indirect promise type is determined when the programmatic expression is a parameter received by the caller function from a higher-level caller and subsequently passed on to the callee function. For example, for the function "f8" that receives programmatic expression "p1" as a parameter when called by f9, then subsequently passes p1 into function "f10" as f8 calls f10 (i.e., within f8 a call to "f10(p1)"), the programmatic expression of "p1" is determined to be indirect. In one or more embodiments, a direct promise type is determined when the parameter passed into the callee function originated from within the caller function and is not received from a higher-level caller function. In one or more embodiments, a promise of type indirect is further classified as trivial, semi-trivial, or complex by determining the promise type of the promise at the highest-level caller function where the promise originated. As demonstrated in the above example, if p1 is originally defined in f9, the promise type of p1 (e.g., indirect trivial, indirect semi-trivial, or indirect complex) is determined by examining p1 within f9 in the manner described above. For example, if p1 is only a single named reference within f9 (e.g., a variable "v4") that is passed into f8 as a parameter and then further passed into f10, p1 is determined to be an indirect trivial promise type.

In one or more embodiments, the value for the programmatic expression is determined using the promise type and the programmatic expression. In one or more embodiments, the value is an optimistic evaluation of the programmatic expression to be included in compiled code. In one or more embodiments, determining the value includes analysis of the promise type and the programmatic expression at the call site within the caller (i.e., where the programmatic expression is passed into a callee function), at the callee function entry, and at the site within the callee function where the argument is referenced.

In one or more embodiments, for a direct trivial promise type, the value for the programmatic expression is determined as follows. At the call site, the current value is extracted from the local variable. For example, for the function "f1" that passes the variable "v1" into function "f2" as f1 calls f2 (i.e., within f1 a call to "f2(v1)"), the programmatic expression of "v1" is determined to be direct trivial. At the call site (e.g., where f1 calls "f2(v1)"), the current value of v1 is extracted. In this example, at the time of calling, v1 has a value of "2." Further, an assumption is generated and set to "true," as the assumption has yet to be invalidated as described below. The current value (i.e., 2), assumption (i.e., true), programmatic expression (i.e., "v1"), and reference to caller function f1 are passed to the callee function f2. Upon entry of execution into the callee function, a synthetic local variable "evaluated value" is reserved but empty. At the place within the callee function where the callee inspects or forces the value of the argument (e.g., the line within f2 where the sole argument is referenced, such as "print(argument)"), as long as the assumption is true, the evaluated value is set to the current value that is passed into the callee function. In this example, the evaluated value of "argument" within f2 is set to 2. In one or more embodiments, the value for the programmatic expression is the evaluated value as described herein. For example, for the programmatic expression of "v1" of promise type direct trivial as passed from f1 into f2, the value is determined to be 2.

In one or more embodiments, for a direct semi-trivial promise type, the value for the programmatic expression is determined as follows. At the call site, the current value is evaluated from the function as applied to the local variable. For example, for the function "f3" that passes the length of variable "v2" into function "f4" as f3 calls f4 (i.e., within f3 a call to "f4(len(v2))"), the programmatic expression of "len(v2)" is determined to be direct semi-trivial. At the call site (e.g., where f3 calls "f4(len(v2))"), the current value of len(v2) is evaluated. In this example, assuming v2 is a 6-character string, at the time of calling, len(v2) has a value of "6." Further, an assumption is generated and set to "true," as the assumption has yet to be invalidated as described below. The current value (i.e., 6), assumption (i.e., true), programmatic expression (i.e., "len(v2)"), and reference to caller function f3 are passed to the callee function f4. Upon entry of execution into the callee function, a synthetic local variable "evaluated value" is reserved but empty. At the place within the callee function where the callee inspects or forces the value of the argument (e.g., the line within f4 where the sole argument is referenced, such as "print(argument)"), as long as the assumption is true, the evaluated value is set to the current value that is passed into the callee function. In this example, the evaluated value of "argument" within f4 is set to 6. In one or more embodiments, the value for the programmatic expression is the evaluated value as described herein.

In one or more embodiments, for a direct complex promise type, the value for the programmatic expression is determined as follows. For example, for the function "f5" that passes the result of applying function "f6" to "v3" into function "f7" as f5 calls f7 (i.e., within f5 a call to "f7(f6 (v3))"), the programmatic expression of "f6(v3)" is determined to be direct complex. At the call site, a current value variable is generated yet remains empty. Further, an assumption is generated and set to "true," as the assumption has yet to be invalidated as described below. The current value (i.e., NULL), assumption (i.e., true), programmatic expression (i.e., "f6(v3)"), and reference to caller function f5 are passed to the callee function f7. Upon entry of execution into the callee function, a synthetic local variable "evaluated value" is reserved but empty.

At the place within the callee function where the callee inspects or forces the value of the argument (e.g., the line within f7 where the sole argument is referenced, such as "print(argument)"), the caller function system state (i.e., the activation frame of the caller function) is retrieved and the programmatic expression is evaluated in the context of the caller function system state, with the evaluated value set to the result of the evaluation. In one or more embodiments, the caller function system state and/or activation frame of the caller function is determined using the reference to the caller function. For example, if function "f1" calls function "f2" and includes a reference to function "f1", the system state (e.g., stack contents, program counter, local and global variable states, etc.) associated with function f1 is retrieved, such as from an execution call stack or heap. In this way, functions may be evaluated using the system state associated with one or more caller or parent functions. For example, the system state as within function f5 is retrieved and f6(v3) is evaluated within that system state, and the evaluated value is set to that result. In one or more embodiments, the value for the programmatic expression is the evaluated value as described herein. In this example, if the result of evaluating f6(v3) within the system state of f5 is "4," the value is determined to be 4.

In one or more embodiments, for de-optimizing an optimized code portion that has an associated assumption marked as invalid, the associated programmatic expression may be treated as a complex promise type and a second value may be determined for the programmatic expression. This is described in more detail below in connection with de-optimizing.

In one or more embodiments, for an indirect promise type (e.g., indirect trivial, indirect semi-trivial, or indirect complex), determining the value for the programmatic expression differs from above only with respect to behavior at the caller site, and is determined as follows. In one or more embodiments, at the caller site the current value of the programmatic expression, assumption, original programmatic expression, and reference to the parent are passed on to the callee function as received by the caller function. For example, if function "f8" receives a current value, assumption, programmatic expression, and parent reference for programmatic expression "p1," and then f8 calls function "f10" while passing in p1 as an argument, the same current value, assumption, programmatic expression, and parent reference is passed onto f10. The determination of the value of the programmatic expression at the callee site (i.e., within f10) proceeds as described above, however the parent reference points to the parent of f8 rather than to f8.

In one or more embodiments, in STEP 206, the programmatic expression is compiled into an optimized code portion using the value, an assumption, and an expression scope. In one or more embodiments, an assumption is a global Boolean flag that is checked without any cost in compiled code and is created for each programmatic expression. For example, for a programmatic expression which includes variable "v1," a global Boolean flag "av1" is created and set to true. In one or more embodiments, an expression scope is an indication of the scope of the local variable included in the programmatic expression. For example, for the programmatic expression for local variable "v1" originally defined within function "f1," the expression scope indicates that the scope of the programmatic expression for local variable v1 is the function f1.

In this example, the programmatic expression is compiled into optimized code portion that references the value of the of the programmatic expression as determined in STEP 204 instead of using a lazy or call-by-need evaluation for the programmatic expression run through an interpreter at runtime.

In one or more embodiments, the programmatic expression is compiled by the compiler. In one or more embodiments, the programmatic expression is compiled by the optimization engine, which may include some functionality of the compiler. After compiling the programmatic expression into an optimized code portion, one or more embodiments of the invention proceeds to STEP 208 in FIG. 2B.

Figure 2B:
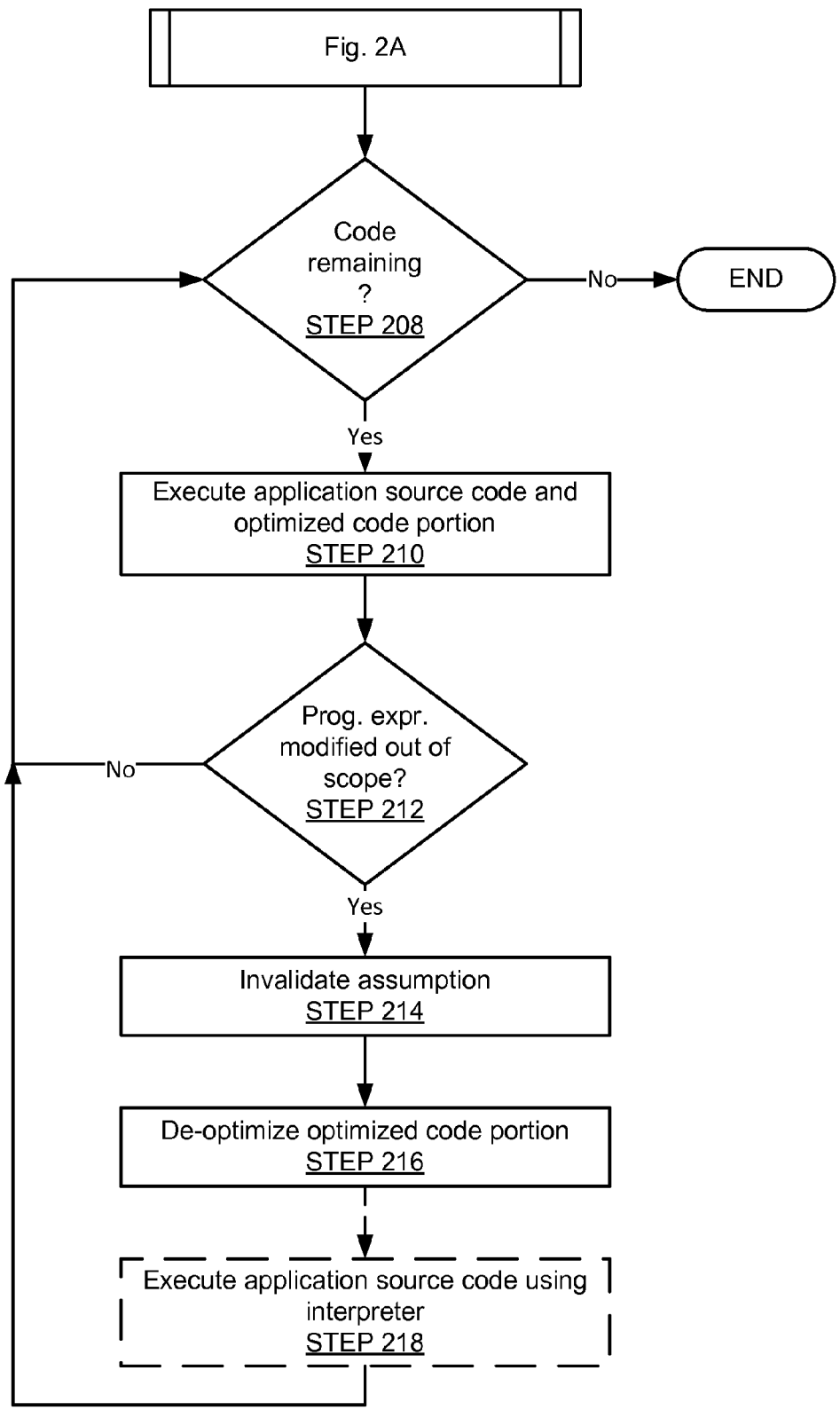

FIG. 2B shows a flowchart for generating executable code from application source code in one or more embodiments of the invention. In one or more embodiments, in STEP 208, it is determined if there is application source code remaining to execute. In one or more embodiments, in STEP 210, if there is remaining application source code to execute as determined in STEP 208, the application source code is executed, wherein the application source code includes the optimized code portion. In one or more embodiments, the application source code is executed by an execution engine. In one or more embodiments, some or all of the source code including the optimized source code is not interpreted as it is executed. For example, the compiled executable code of the optimized code portion as generated in STEP 204 is executed rather than interpreted. One of ordinary skill in the art will understand the use of compiled executable code as compared to interpreted code in a runtime environment. Generally, executable code run in compiled form is run in a faster mode that is tailored toward a specific behavior. In contrast, executable code run in interpreted mode is run in a relatively slower but more versatile fashion. In one or more embodiments, the optimized code portion includes the assumption and the expression scope associated with the programmatic expression.

In one or more embodiments, in STEP 212, it is determined if the programmatic expression is modified outside of the expression scope. In one or more embodiments, the optimized code portion as compiled in STEP 204 includes an expression scope which includes information related to where the programmatic expression originated and/or is defined. For example, the expression scope for variable "v1" which is defined in function "f1" is the function "f1." Some programming languages with functional components (e.g., R) contain functions which modify variables outside of the variable's expressions scope. For example, a function "f1" may create the variable "v1" and then call function "f2." Function f2 may include a call to the super assign function (e.g., "v1<←10") which modifies the value of v1 not only within the scope of function f2, but also within the scope of f1. In this example, upon execution of the super assignment function within function f2, it is determined that the programmatic expression is modified outside of the expression scope. In one or more embodiments, the determination is made by the execution engine. Upon a determination that the programmatic expression is modified outside of the expression scope, the method proceeds to STEP 214, or otherwise proceeds back to STEP 208.

In one or more embodiments, in STEP 214, the assumption is invalidated. An assumption is invalidated or marked false when the local variable programmatic expression with which it is associated is accessed from outside the local variable's activation (i.e., accessed from a different function from which the local variable is created). For example, upon the determination in STEP 212, the assumption variable associated with a programmatic expression and/or an optimized code portion is set to 'false.' In one or more embodiments, the assumption is invalidated by the execution engine.

In one or more embodiments, in STEP 216 the optimized code portion is de-optimized. In one or more embodiments, the optimized code portion for which the assumption or assumptions has been marked as false is deoptimized by being decompiled and marked to be interpreted at runtime. Subsequent execution of the programmatic expression may then be handed using an interpreter. In one or more embodiments, the optimized code portion is deoptimized by being replaced with the programmatic expression. In this example, instead of having replaced the programmatic expression with an optimistically evaluated value, the original programmatic expression is reinserted into the application source code. In one or more embodiments, the optimized code portion is de-optimized by the optimization engine.

In one or more embodiments, de-optimizing the optimized code portion may include treating the associated programmatic expression as a complex promise type. For example, a programmatic expression of direct trivial promise type may be treated as direct complex promise type, and a programmatic expression of indirect semi-trivial promise type may be treated as indirect complex promise type. In this embodiment, a second value for the programmatic expression is determined using a complex promise type. The process as described above in connection with STEP 204 is applied to the programmatic expression to determine the second value. The programmatic expression is then compiled into a second optimized code portion using the second value, the assumption, and the expression scope as discussed in connection with STEP 206. In this way, for a trivial or semi-trivial programmatic expression whose assumption has been invalidated, the second optimized portion is created which may be slower than the first optimized portion, yet faster than simply running the programmatic expression via interpreter and may avoid the assumption invalidating event.

In optional STEP 218, the application source code may be executed using an interpreter, interpreting the value of the local variables associated with the false assumption or assumptions at runtime. After the application source code is executed using an interpreter, one or more embodiments of the invention return to STEP 208. In one or more alternative embodiments, after the optimized code portion is de-optimized, one or more embodiments of the invention return to STEP 208.

While the various steps in the flowcharts in FIG. 2 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
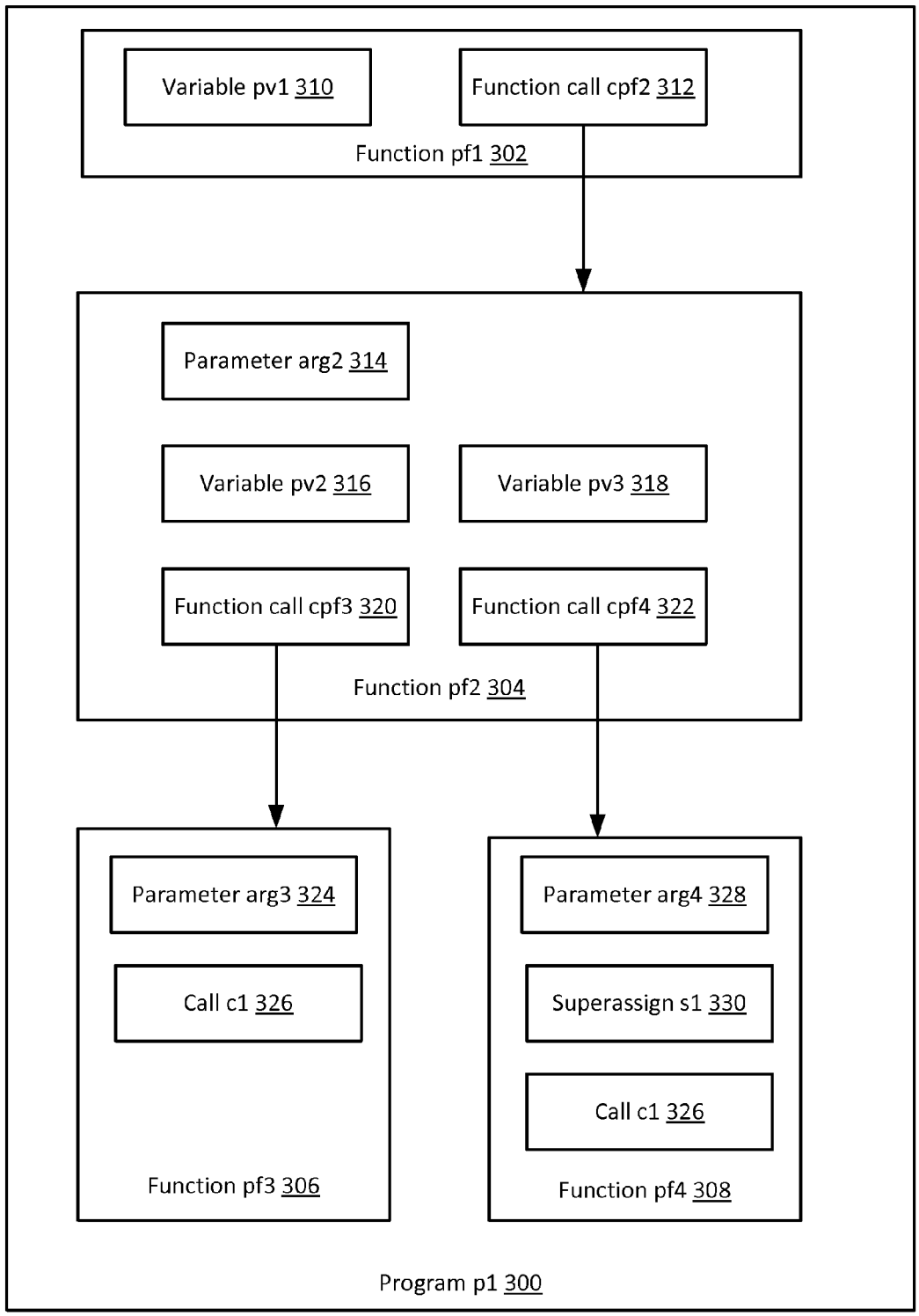
FIG. 3 shows a schematic diagram in accordance with one or more embodiments of the invention.

FIG. 3 shows an example application source code program p1 (300) in accordance with one or more embodiments of the invention. The following example is for explanatory purposes only and not intended to limit the scope of the invention.

Program p1(300) is a collection of application source code written in the R programming language. Program p1 (300) includes four functions (e.g., function pf1 (302), function pf2 (304), function pf3 (306), and function pf4 (308)).

In this example, function pf1 (302) defines a local variable pv1 (310). Function pf1 (302) includes a call to function pf2 (304) via function call cpf2 (312). In this example, any parameter passed into function pf2 (304) is parameter arg2 (314). Function pf2 (304) defines local variables pv2 (316) and pv3 (318). Function pf2 (304) also includes a call to function pf3 (306) via function call cpf3 (320) and a call to function pf4 (308) via function call cpf4 (322).

In this example, any parameter passed into function pf3 (306) is parameter arg3 (324). Function pf3 (306) includes a call to a system function via call c1 (326). In this example, any parameter passed into function pf4 (308) is parameter arg4 (328). Function pf4 (308) includes a call to a system function via call c1 (326), and a call to a super assign function s1 (330).

In this example, the control flow of the application source code indicates that function pf2 (304) set a value of "2" to variable pv2 (316). Function pf2 (304) then calls function pf3 (306) passing in variable pv2 (316) as an argument. Function pf3 (306) treats variable pv2 (316) as received parameter arg3 (324). Function pf3 (306) will then pass in parameter arg3 (324) to a simple system call c1 (326), which merely prints the value it receives.

In this example, the optimization engine determines a programmatic expression of variable pv2 (316), since variable pv2 (316) is passed into function pf3 (306) at function call cpf3 (320). The optimization engine determines that the programmatic expression is of promise type direct trivial, since it is a local variable passed in as a parameter. Since the programmatic expression is direct trivial, the optimization engine determines the value for the programmatic expression to be "2", which is the value of local variable at the call site. The programmatic expression is then compiled into an optimized code portion whereby at the site within function pf3 (308) where the value passed into function pf3 (306) is used (e.g., call c1 (326)), the value of 2 is directly compiled in rather than evaluating the value of parameter arg3 (324) at call c1 (326) by an interpreter at runtime. The application source code is then executed, and the optimized code portion is executed without use of an interpreter.

In another example, the control flow of the application source code indicates that function pf2 (304) set a value of "2" to variable pv2 (316). Function pf2 (304) then calls function pf3 (306) passing in the length of variable pv2 (316) (e.g., "len (pv2)") as an argument. Function pf3 (306) treats "len(pv2)" as received parameter arg3 (324). Function pf3 (306) will then pass in parameter arg3 (324) to a simple system call c1 (326), which merely prints the value it receives.

In this example, the optimization engine determines a programmatic expression of "len(pv2)," which is passed into function pf3 (306) at function call cpf3 (320). The optimization engine determines that the programmatic expression is of promise type direct semi-trivial, since it is a well-known, trivial, and side-effect free function evaluated on a local variable and passed in as a parameter. Since the programmatic expression is direct semi-trivial, the optimization engine determines the value for the programmatic expression to be "1", which is the evaluation of "len(pv2)" (i.e., the character "2" is only one character in length) at the call site. The programmatic expression is then compiled into an optimized code portion whereby at the site within function pf3 (308) where the value passed into function pf3 (306) is used (e.g., call c1 (326)), the value of 1 is directly compiled in rather than evaluating the value of parameter arg3 (324) at call c1 (326) by an interpreter at runtime. The application source code is then executed, and the optimized code portion is executed without use of an interpreter.

In another example, the control flow of the application source code indicates that function pf2 (304) set a value of "2" to variable pv2 (316). Function pf2 (304) then calls function pf3 (306) passing in an arbitrary function applied to variable pv2 (316) (e.g., "myFunction (pv2)") as an argument. Function pf3 (306) treats "myFunction (pv2)" as received parameter arg3 (324). Function pf3 (306) will then pass in parameter arg3 (324) to a simple system call c1 (326), which merely prints the value it receives.

In this example, the optimization engine determines a programmatic expression of "myFunction (pv2)," which is passed into function pf3 (306) at function call cpf3 (320). The optimization engine determines that the programmatic expression is of promise type direct complex, since it is arbitrary code passed as a parameter to a callee function. Since the programmatic expression is direct complex, the optimization engine evaluates the result of "myFunction (pv2)" in the context of the caller function, function pf2 (304). The programmatic expression is then compiled into an optimized code portion whereby at the site within function pf3 (306) where the value passed into function pf3 (306) is used (e.g., call c1 (326)), the result of "myFunction(pv2)" in the context of the caller function (e.g., function pf2 (304)) is directly compiled in rather than evaluating the value of parameter arg3 (324) at call c1 (326) by an interpreter at runtime. The application source code is then executed, and the optimized code portion is executed without use of an interpreter.

In another example, the control flow of the application source code indicates that function pf1 (302) set a value of "6" to variable pv1 (310). Function pf1 (302) then calls function pf2 (304) passing in variable pv1 (310) as an argument. Function pf2 (304) treats variable pv1 (310) as received parameter arg2 (314). Function pf2 (304) then calls function pf3 (306) at function call cpf3 (320), passing in parameter arg2 (314) as an argument. Function pf3 (306) treats parameter arg2 (314) as received parameter arg3 (324). Function pf3 (306) will then pass in parameter arg3 (324) to a simple system call c1 (326), which merely prints the value it receives.

In this example, the optimization engine determines a programmatic expression of variable pv1 (316), since variable pv1 (316) is received as parameter arg2 (314) within function pf2 (304) before it is passed into function pf3 (306) at function call cpf3 (320). The optimization engine determines that the programmatic expression is of promise type indirect trivial, since it is a promise passed on to a subsequent function call, yet is merely a local variable passed in as a parameter in the original caller function. Since the programmatic expression is indirect trivial, the optimization engine determines the value for the programmatic expression to be "6", which is the value of local variable at the original call site. The programmatic expression is then compiled into an optimized code portion whereby at the site within function pf3 (308) where the value passed into function pf3 (306) is used (e.g., call c1 (326)), the value of 6 is directly compiled in rather than evaluating the value of parameter arg3 (324) at call c1 (326) by an interpreter at runtime. The application source code is then executed, and the optimized code portion is executed without use of an interpreter.

In another example, the control flow of the application source code indicates that function pf2 (304) set a value of "5" to variable pv3 (318). Function pf2 (302) then calls function pf3 (306) passing in variable pv3 (318) as an argument. Function pf2 (302) then calls function pf4 (306) passing in variable pv3 (318) as an argument. Function pf3 (306) treats variable pv3 (318) as received parameter arg3 (324) then pass in parameter arg3 (324) to a simple system call c1 (326), which merely prints the value it receives. Function pf4 (308) treats variable pv3 (318) as received parameter arg4 (328). Function pf4 (308) then performs a super assignment on variable pv3 (318), which directly alters the value of variable pv3 (318) within the scope of caller function pf2 (304) although called from within the scope of callee function pf4 (308). Function pf4 then passes in parameter arg4 (328) to a simple system call c1 (326), which merely prints the value it receives.

In this example, the optimization engine determines a first programmatic expression of variable pv3 (318), since variable pv3 (318) is passed into function pf3 (306) at function call cpf3 (320), and determines the value in the manner described in previous sections to be "5." The first programmatic expression is then compiled into a first optimized code portion whereby at the site where the value passed into function pf3 (306) is used (e.g., call c1 (326)), the value of 5 is directly compiled in rather than evaluating the value of parameter arg3 (324) by an interpreter at runtime. The application source code is then executed, and the first optimized code portion is executed without use of an interpreter.

Further in this example, the optimization engine determines a second programmatic expression of variable pv3 (318), since variable pv3 (318) is passed into function pf4 (308) at function call cpf4 (322). The optimization engine determines that the second programmatic expression is of promise type direct trivial, since it is a local variable passed in as a parameter. Since the programmatic expression is direct trivial, the optimization engine determines the value for the programmatic expression to be "5", which is the value of local variable at the call site. The second programmatic expression is then compiled into a second optimized code portion whereby at the site where the value passed into function pf4 (308) is used (e.g., call c1 (326)), the value of 5 is directly compiled in rather than evaluating the value of parameter arg4 (328) by an interpreter at runtime. The application source code is then executed, and the second optimized code portion is executed without use of an interpreter.

In this case, however, the variable pv3 (318) is modified outside of its scope by super assignment s1 (330). Upon determination that the modification outside of scope has occurred, the assumptions associated with variable pv3 (318) are invalidated. Next, any optimized code portions (i.e., the first optimized code portion and the second optimized code portion) associated with variable pv3 (318) are de-optimized. In this example, the compiled optimized code portions are decompiled, such that later executions are performed using an interpreter.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) shown in FIG. 4 may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for generating an optimized application source code, comprising:
    determining that a programmatic expression in a first function call corresponds to a complex promise type based on the programmatic expression comprising a second function call having user-defined code, the second function call to a second function, the first function call located in a caller function of an original application source code;
    determining a first value for the programmatic expression based on evaluating the second function using a context of the caller function system state during execution of the caller function;
    compiling the programmatic expression into a first optimized code portion using the first value, an assumption, and an expression scope, wherein the assumption denotes whether the first value is valid;
    replacing the programmatic expression in the original application source code with the first optimized code portion to create the optimized application source code;
    executing the optimized application source code;
    responsive to executing the optimized application source code, determining that the programmatic expression is modified outside of the expression scope;
    in response to determining that the programmatic expression is modified outside of the expression scope, invalidating the assumption to indicate that the first value is invalid;
    in response to invalidating the assumption, de-optimizing the first optimized code portion, wherein de-optimizing comprises determining a second value for the programmatic expression using the complex promise type; and
    continuing execution using the second value for the programmatic expression.

2. The method of claim 1, wherein de-optimizing the first optimized code portion comprises decompiling the first optimized code portion.

3. The method of claim 2, further comprising: executing the optimized application source code using an interpreter.

4. The method of claim 1, wherein de-optimizing the first optimized code portion further comprises replacing the first optimized code portion with the programmatic expression.

5. The method of claim 4, further comprising: executing the optimized application source code using an interpreter.

6. The method of claim 1, wherein de-optimizing the first optimized code portion further comprises:
    compiling the programmatic expression into a second optimized code portion using the second value, the assumption, and the expression scope; and
    wherein continuing execution further comprises continuing execution using the second optimized code portion as the second value for the programmatic expression.

7. A system for generating an optimized application source code, comprising:
- a computer processor and memory;
- an optimization engine stored in the memory and executing on the computer processor, configured to:
- determine that a programmatic expression in a first function call corresponds to a complex promise type based on the programmatic expression comprising a second function call having user-defined code, the second function call to a second function, the first function call located in a caller function of an original application source code,
- determine a first value for the programmatic expression based on evaluating the second function using a context of the caller function system state during execution of the caller function,
- compile the programmatic expression into a first optimized code portion using the first value, an assumption, and an expression scope, wherein the assumption denotes whether the first value is valid,
- replace the programmatic expression in the original application source code with the first optimized code portion to create the optimized application source code, and
- in response to invalidating the assumption by an execution engine, de-optimize the first optimized code portion, wherein de-optimizing comprises determining a second value for the programmatic expression using the complex promise type; and
- the execution engine stored in the memory and executing on the computer processor, configured to:
- execute the optimized application source code,
- responsive to executing the optimized application source code, determine that the programmatic expression is modified outside of the expression scope to indicate that the first value is invalid,
- in response to determining that the programmatic expression is modified outside of the expression scope, invalidate the assumption to indicate that the first value is invalid, and
- in response to determining a second value for the programmatic expression by the optimization engine, continue execution using the second value for the programmatic expression.

8. The system of claim 7, wherein the optimization engine is further configured to decompile the first optimized code portion.

9. The system of claim 8, wherein the execution engine is further configured to execute the optimized application source code using an interpreter.

10. The system of claim 7, wherein the optimization engine is further configured to replace the first optimized code portion with the programmatic expression.

11. The system of claim 10, wherein the execution engine is further configured to execute the optimized application source code using an interpreter.

12. The system of claim 7, wherein the optimization engine is further configured to: compile the programmatic expression into a second optimized code portion using the second value, the assumption, and the expression scope; and wherein the execution engine is further configured to continue execution comprises using the second optimized code portion as the second value for the programmatic expression.

13. A non-transitory computer readable medium comprising instruction that, when executed by a processor, perform a method for generating an optimized application source code, comprising:
- determining that a programmatic expression in a first function call corresponds to a complex promise type based on the programmatic expression comprising a second function call having user-defined code, the second function call to a second function, the first function call located in a caller function of an original application source code;
- determining a first value for the programmatic expression based on evaluating the second function using a context of the caller function system state during execution of the caller function;
- compiling the programmatic expression into a first optimized code portion using the first value, an assumption, and an expression scope, wherein the assumption denotes whether the first value is valid;
- replacing the programmatic expression in the original application source code with the first optimized code portion to create the optimized application source code;
- executing the optimized application source code;
- responsive to executing the optimized application source code, determining that the programmatic expression is modified outside of the expression scope;
- in response to determining that the programmatic expression is modified outside of the expression scope, invalidating the assumption to indicate that the first value is invalid;
- in response to invalidating the assumption, de-optimizing the first optimized code portion, wherein de-optimizing comprises determining a second value for the programmatic expression using the complex promise type; and
- continuing execution using the second value for the programmatic expression.

14. The non-transitory computer readable medium of claim 13, wherein de-optimizing the first optimized code portion further comprises decompiling the first optimized code portion.

15. The non-transitory computer readable medium of claim 14, the method further comprising: executing the optimized application source code using an interpreter.

16. The non-transitory computer readable medium of claim 13, wherein de-optimizing the first optimized code portion further comprises replacing the first optimized code portion with the programmatic expression.

17. The non-transitory computer readable medium of claim 13, wherein de-optimizing the first optimized code portion further comprises: compiling the programmatic expression into a second optimized code portion using the second value, the assumption, and the expression scope; and wherein continuing execution further comprises using the second optimized code portion as the second value for the programmatic expression.

* * * * *

UNITED STATES PATENT AND TRADEMARK OFFICE
CERTIFICATE OF CORRECTION

PATENT NO. : 9,836,288 B2
APPLICATION NO. : 14/690592
DATED : December 5, 2017
INVENTOR(S) : Stadler et al.

Page 1 of 1

It is certified that error appears in the above-identified patent and that said Letters Patent is hereby corrected as shown below:

In Column 8, Line 19, after "value" delete "of the".

Signed and Sealed this
Third Day of July, 2018

Andrei Iancu
*Director of the United States Patent and Trademark Office*